June 6, 1950  G. W. WATSON  2,510,672
TRIPLE EFFECT VAPORIZATION OF LIQUID
Filed Sept. 25, 1946  2 Sheets-Sheet 1
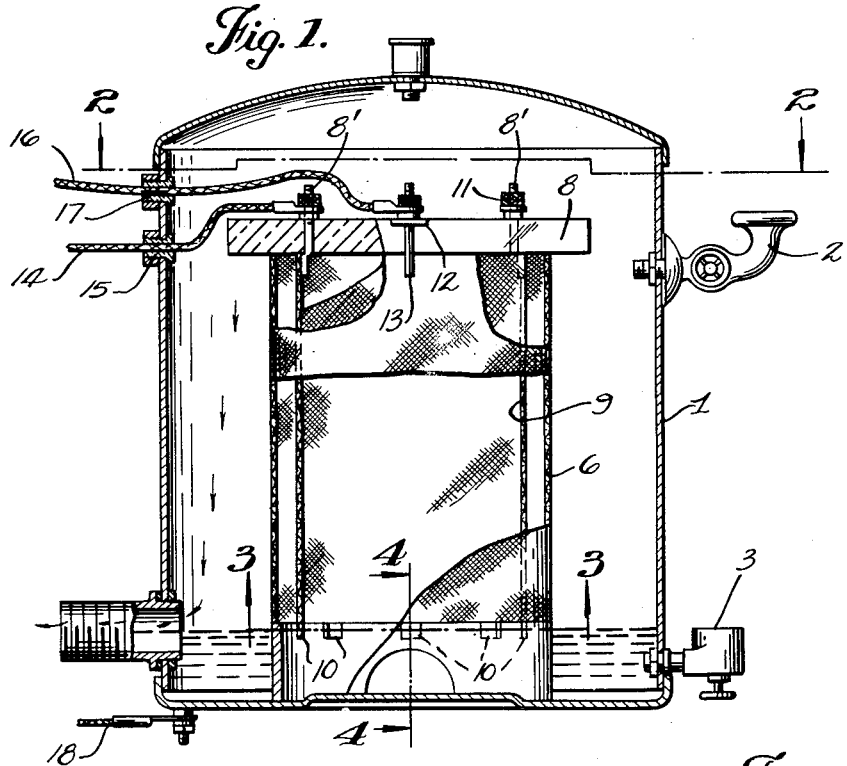
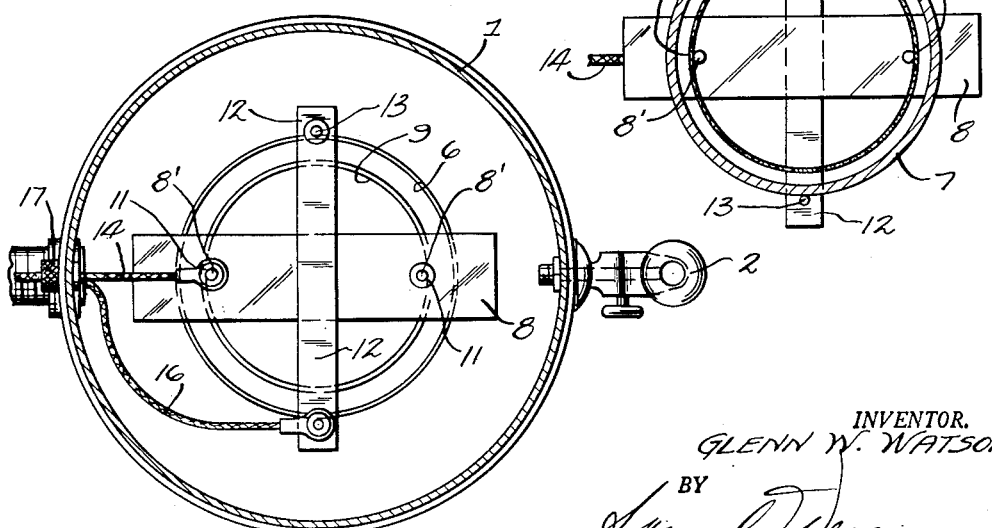
INVENTOR.
GLENN W. WATSON.
BY
Samuel Weisman
ATTORNEY.

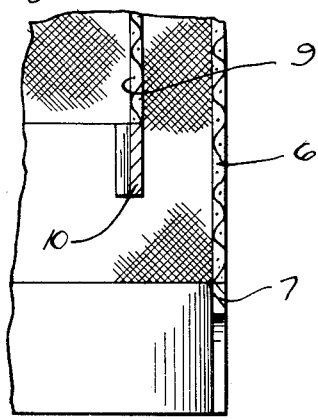
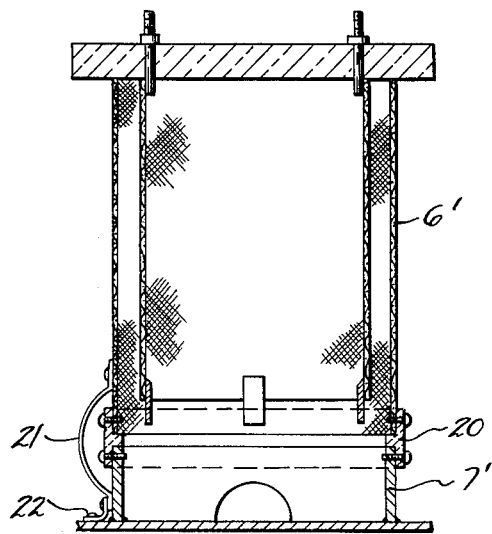
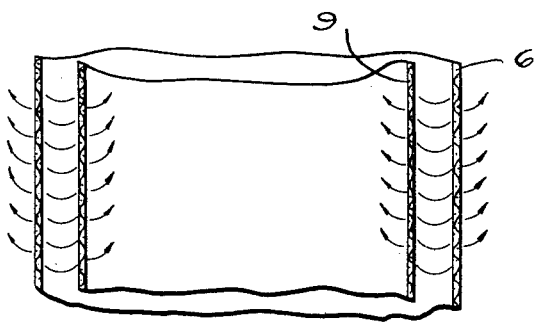
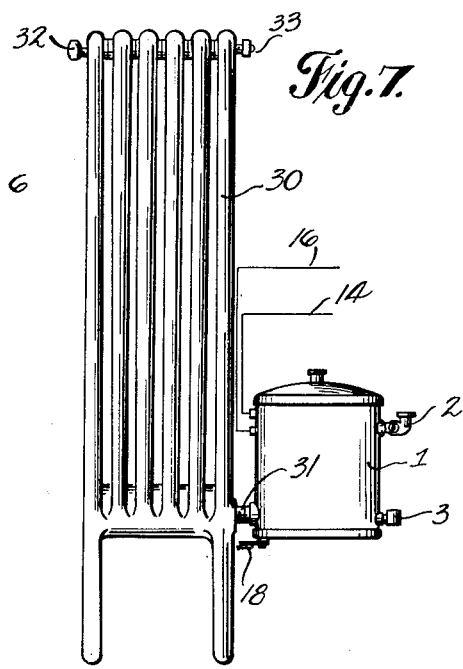
INVENTOR.
GLENN W. WATSON.
BY
Samuel ?
ATTORNEY.

Patented June 6, 1950

2,510,672

UNITED STATES PATENT OFFICE 2,510,672

TRIPLE EFFECT VAPORIZATION OF LIQUID

Glenn W. Watson, Traverse City, Mich.

Application September 25, 1946, Serial No. 699,322

8 Claims. (Cl. 219—40)

This application is a continuation-in-part of my co-pending United States application Serial No. 544,254, filed July 10, 1944, entitled Electrical vaporization of liquids, now abandoned.

In that application there is disclosed a method and apparatus that have a dual action in vaporizing the liquid. A pair or series of electrodes, spaced slightly apart and alternating in sign, is set vertically in the liquid, with the lower ends thereof only slightly immersed in the surface of the liquid. Below the surface of the liquid, the usual rheostat action occurs in heating and vaporizing the liquid. Only a small fraction of the current is thus consumed, on the order of about 2 percent.

With proper spacing between adjacent electrodes, successive bridging films rise between the electrodes above the liquid level. These films carry the major portion of the current and are eventually vaporized thereby. The spacing between electrodes is determined to sustain the films between them. If the electrodes are too widely spaced apart, no film will rise between them. The maximum spacing that permits films to rise is defined in the aforementioned application as the bridging limit.

The general object of the present invention is to improve the efficiency of this method of vaporizing liquid. The electrodes rather than being in strip form as in the earlier application, are in the form of concentric tubes one within the other in the drawings but will also operate when prepared in strip form. The films are consequently of annular form. Thus, if any given film is punctured by vapor pressure from below, it will nevertheless maintain its condition as a film except where punctured and will continue to rise until completely vaporized. A substantially rectangular and smaller film, such as that formed between strip electrodes will more readily disintegrate when punctured and will collapse to form falling liquid droplets which must again be converted to film form. This conversion results in a loss of efficiency. The present invention eliminates the collapse of film to liquid in the manner indicated and, to this extent, increases the efficiency of the process.

Another object of the invention is to heat a portion of the electrodes by means of the current and thereby to cause a preheating of the film by conduction from the electrodes, and aiding in the ultimate vaporization of the film. For this purpose a portion of the electrodes consists of a high resistance material and are preferably constructed in the form of screens made of high resistance wire. The direct heating of the film by conduction from the electrodes constitutes a third heating effect of the current, in addition to the two previously mentioned with reference to the earlier application. Consequently the current has a triple effect on the liquid in one form or another. In other words, the single supply of current operates on the liquid in three different ways, all functioning simultaneously toward the ultimate vaporization of the liquid.

As in the previous application, only a relatively small portion of the electrodes is immersed in the liquid. Since this portion serves to conduct current to the body of the liquid and to start an upward movement it is constituted of material having low resistance or high conductivity. As such, it is provided in the form of separate pieces attached to the lower ends of the exposed electrodes.

The invention is fully disclosed by way of example in the following description and in the accompanying drawings in which:

Figure 1 is a vertical section of a generator constructed according to the invention.

Figure 2 is a section on the line 2—2 of Figure 1,

Figure 3 is a section on the line 3—3 of Figure 1,

Figure 4 is a section on the line 4—4 of Figure 1,

Figure 5 is a vertical section of a modification,

Figure 6 is a diagrammatic view showing the egress of steam, and

Figure 7 is an elevation showing a generator according to the invention connected to a radiator.

Reference to these views will now be made by use of like characters which are employed to designate corresponding parts throughout.

In Figure 1 is shown a suitable housing 1 in which the vaporizing apparatus is mounted. The housing is in the form of a receptacle or tank adapted to contain water which is supplied through a suitable valved intake 2. The invention will be described with reference to the evaporation of water, and it will be understood that other liquids may be vaporized by the same method and means. At a lower level the housing is fitted with a valved filling nipple 3 designed so that it does not permit over-filling and to indicate a liquid level corresponding with the half way height on spaced tips 10.

One of the electrodes is a tubular member 6 consisting for the most part of high resistance material. To the lower end of this member is welded a section such as a tubular extension 7 of a material having high electrical conductivity. The portion 7 rests upon the bottom of container and is thus immersed below the surface of the liquid and is secured to the bottom of the container by welding or other means. The main portion 6 may consist, for example, of a screen of high resistance wire, although other high resistance materials may be employed.

On the upper end of this electrode is mounted an insulating block 8 through which are passed a pair of binding posts 8'. From the block 8 is also suspended the complementary electrode 9 which is also tubular and lies within the electrode 6, 7 in coaxial relation thereto. The electrode 9 is also of high resistance material of the character already set forth in connection with the member 6. The high resistance portion of the electrode 9 does not engage the liquid but slightly in operation and is provided at its lower end with a member or members of low resistance material that extend slightly below the surface of the liquid to an extent even less than the member 7. The parts attached to the member 9 may consist, for example, of a series of spaced tips 10 extending downwardly from the lower edge thereof.

The current flow through solid water between the member 7 and the members 10 is determined by the extent of penetration of the latter into the liquid. Consequently it is immaterial that the member 7 extends farther into the liquid. The elevation of the electrode 9 with its tips 10 can be regulated by adjusting the nuts 11 on the threaded binding posts 8'. The electrode constructions may be reversed if desired whereby the outer electrode will carry the tips and the the inner electrode will have a solid extension supported in the base of container.

A supporting strap 12 is laid transversely upon the block 8 and is fitted at its ends with binding posts 13 connected to the upper end of the electrode 6. One side of the circuit is represented by a conductor 14 passing through a steam sealed insulator 15 and the wall of the housing 1 and attached to one of the binding posts 8'. The other side of the circuit is represented by another conductor 16 passing through a similar insulator 17 mounted in the wall of the housing 1 and attached to one of the binding posts 13. The conducting portion 7 is preferably provided with an auxiliary ground 18 extending to the wall of the housing 1. Although the current divides between the members 6 and 7, it may be desirable to supply a separate current to the portion having higher conductivity. A modification for this purpose is shown in Figure 5. The parts 6', 7' are separated from one another by an inserted thin washer 20 of glass or other insulation. A conductor 21 joins the parts 6', 7' and in turn is grounded at 22.

In the operation of the device, a small portion of the current, about 2 percent, is consumed at the immersed common parts of both electrodes and is conducted by the liquid between these parts. This liquid is heated in the manner of a fluid rheostat. A progression of film rises in the space between the electrodes in the form of liquid hammocks as shown diagrammatically in Figure 6. The bridging films rise in rapid succession and conduct a substantial portion of the current. In so doing they become heated until eventually vaporized. The shape of the hammocks varies according to the pressure conditions in the system.

At any given instant, the hammock at the top of the series should theoretically be the first to vaporize. However, a lower hammock or a portion thereof may become vaporized first, and the vapor pressure released thereby may puncture a hammock above it. The punctured hammock, however, is not thereby entirely destroyed inasmuch as it has an annular configuration and remains intact where not punctured. The punctured portion falls as liquid droplets upon lower hammocks and is for the most part supported thereby to be vaporized again, after being converted into additional film. This reconversion process, which requires consumption of energy, is maintained at a minimum inasmuch as the disintegration of a punctured film into liquid droplets is restricted to the area thereof that has actually been punctured.

Another portion of the current is consumed in raising the temperature of the high resistance parts 6 and 9 of the respective electrodes. The heat in these parts is conducted directly to the films or hammocks, thereby preheating them and aiding in their ultimate evaporation.

It is now apparent that the current is used in three different ways simultaneously to vaporize the liquid. This method is highly efficient inasmuch as only a relatively small quantity of the liquid is heated by the usual rheostat method between the immersed parts of the electrodes. In the thin bridging films or hammocks the vaporization is considerably more efficient since no surrounding masses of liquid need be heated as in the rheostat method. In other words, convection heat is transferred from the heated screens to the liquid bridging films and combined with the heat caused by the passage of the alternating or other current in the films. Both sources of heat are in action simultaneously and aid in the production of steam.

This dual heat effect consumes the greatest portion of the current and produces the greatest portion of the steam that is generated. This dual effect acts simultaneously with the water rheostat effect, so that the result is the combined action of three distinct uses of the current operating on the liquid to vaporize the same. The result of this method is instantaneous generation of the steam, even though the main water supply be of a temperature just above freezing.

It has been found advantageous to use this method with alternating current of various frequencies, although the method may be performed with direct current. The addition of borax to the water supply aids in preventing oxidation of the electrodes and permits them to operate for a period of years without requiring cleaning.

Steam generation will start as long as any portion of tips 10 contacts the water body and will continue to operate until the water level recedes below the tips to the extent of about a quarter on an inch.

In Figure 7 is shown an installation in which the generator is connected to a room radiator 30 by a coupling or nipple 31 at the water level in the generator, permitting the flow of steam to the radiator and return of water to the generator. A flexible coupling may be used in which instance a slight raising of the generator would cut off any current consumption and act as a switch. Lowering slightly will turn the current on. The radiator is equipped with the usual air vent 32 and safety valve 33. This figure illustrates the relative size of the generator and room radiator.

Although specific embodiments of the invention have been illustrated and described, it will be understood that various alterations in the details of construction may be made without departing from the scope of the invention as indicated by the appended claims.

What I claim is:

1. An apparatus for electrically vaporizing a liquid, comprising a vessel for containing such liquid, a pair of upright electrodes spaced apart and adapted to be immersed slightly in the liquid, the spacing of said electrodes being within the bridging limit of the liquid, the major portion of said electrodes being of highly resistant material, and the lower ends of the electrodes being of a more conductive material.

2. An apparatus for electrically vaporizing a liquid, comprising a vessel for containing such liquid, a pair of upright electrodes spaced apart and adapted to be immersed slightly in the liquid, the spacing of said electrodes being within the bridging limit of the liquid, the major portion of said electrodes being of highly resistant material, and the lower ends of the electrodes being of a more conductive material, and insulating material inserted between the resistant and conductive parts of at least one of said electrodes.

3. An apparatus for electrically vaporizing a liquid, comprising a vessel for containing such liquid, a pair of upright electrodes spaced apart and adapted to be immersed slightly in the liquid, the spacing of said electrodes being within the bridging limit of the liquid, the major portion of said electrodes being of highly resistant screen material, and the lower ends of the electrodes being of a more conductive material.

4. An apparatus for electrically vaporizing a liquid, comprising a vessel for containing such liquid, a pair of upright electrodes spaced apart and adapted to be immersed slightly in the liquid, the spacing of said electrodes being within the bridging limit of the liquid, the major portion of said electrodes being of highly resistant screen material, and the lower ends of the electrodes being of a more conductive material, and insulating material inserted between the resistant and conductive parts of at least one of said electrodes.

5. An apparatus for electrically vaporizing a liquid, comprising a vessel for containing such liquid, a pair of tubular, substantially coaxial and upright electrodes adapted to be immersed slightly in the liquid, said electrodes being spaced apart within the bridging limit of the liquid, the major portion of said electrodes being of highly resistant material, and the lower ends of the electrodes being of a more conductive material.

6. An apparatus for electrically vaporizing a liquid, comprising a vessel for containing such liquid, a pair of tubular, substantially coaxial and upright electrodes adapted to be immersed slightly in the liquid, said electrodes being spaced apart within the bridging limit of the liquid, the major portion of said electrodes being of highly resistant screen material, and the lower ends of the electrodes being of a more conductive material.

7. An apparatus for electrically vaporizing a liquid, comprising a vessel for containing such liquid, a pair of tubular, substantially coaxial and upright electrodes adapted to be immersed slightly in the liquid, said electrodes being spaced apart within the bridging limit of the liquid, the major portion of said electrodes being of highly resistant material, and the lower ends of the electrodes being of a more conductive material, and insulating material inserted between the resistant and conductive parts of at least one of said electrodes.

8. An apparatus for electrically vaporizing a liquid, comprising a vessel for containing such liquid, a pair of tubular, substantially coaxial and upright electrodes adapted to be immersed slightly in the liquid, said electrodes being spaced apart within the bridging limit of the liquid, the major portion of said electrodes being of highly resistant screen material, and the lower ends of the electrodes being of a more conductive material, and insulating material inserted between the resistant and conductive parts of at least one of said electrodes.

GLENN W. WATSON.

REFERENCES CITED

The following references are of record in the file of this patent:

UNITED STATES PATENTS

| Number | Name | Date |
|---|---|---|
| 1,322,860 | Wublens et al. | Nov. 25, 1919 |
| 1,738,733 | Schur et al. | Dec. 10, 1929 |
| 2,000,628 | White | May 7, 1935 |